2,693,290

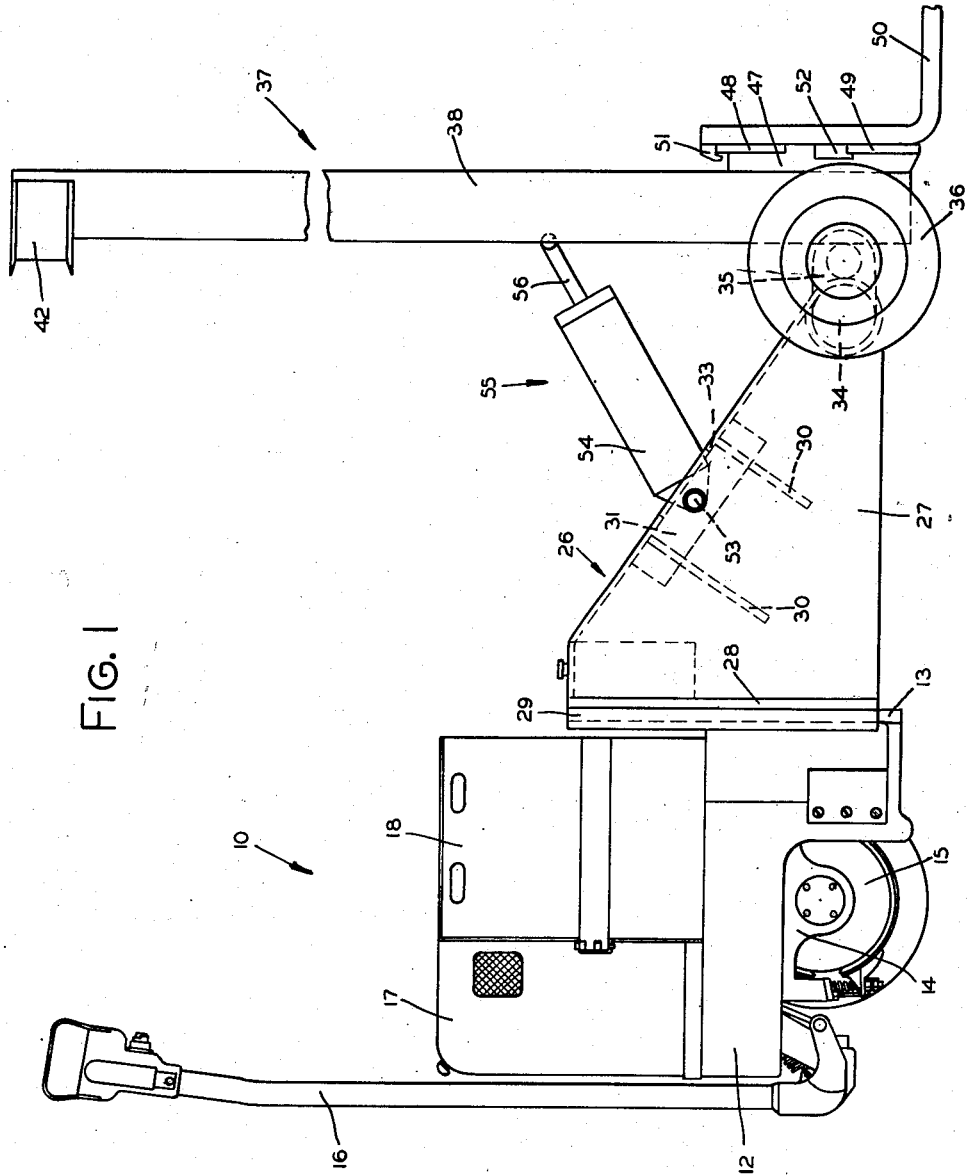

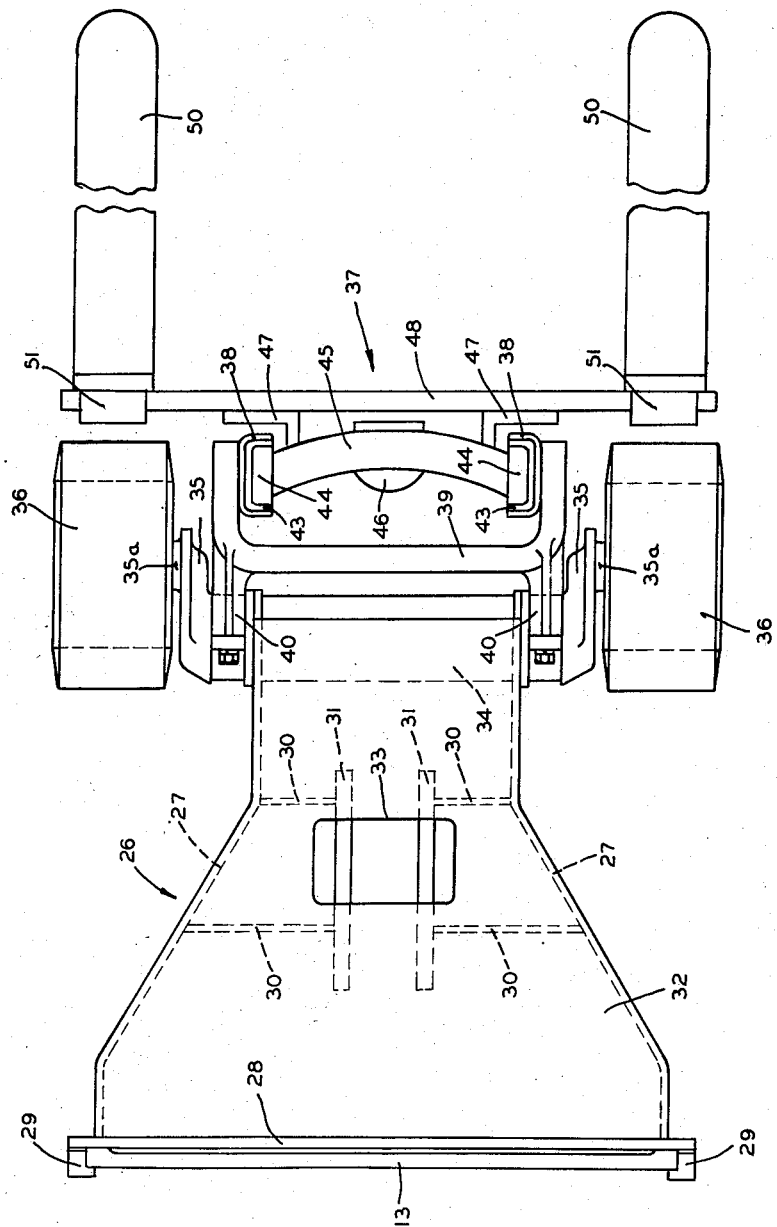

ATTACHMENT FOR POWERED HAND
LIFT TRUCKS

Morris R. Elliott and George L. Turner, Buchanan, Mich., assignors to Clark Equipment Company, Buchanan, Mich., a corporation of Michigan Application November 15, 1950, Serial No. 195,872

6 Claims. (Cl. 214—674)

Our invention relates to a self-propelled hand lift truck for engaging, transporting, tiering, and depositing pallet supported loads.

Conventional forms of hand operated lift trucks, with which we are familiar, generally comprise a main frame which is supported on a wheel unit. Disposed forwardly of the main frame is load supporting platform means which is supported at its forward end by means of ground engaging extensible wheel assemblies. The load supporting platform means at its rear end is adapted to be mounted on the main frame for limited vertical movement relative thereto. Limited vertical movement of the load supporting means relative to the main frame is effected by one or more hydraulic piston and cylinder assemblies carried by the main frame, which are operatively connected through suitable linkage means to the extensible wheel assemblies for extending and retracting the latter. Hand lift trucks of this character cannot be used in tiering operations, as the load supporting platform means has only a small range of vertical movement.

It is an object of our present invention to provide an attachment, for a self-propelled hand lift truck, which has embodied therewith a load elevating mechanism adapted for tiering or stacking pallet supported loads.

It is another object of our present invention to provide an attachment as aforesaid with a normally vertically extending telescopic mast construction which provides support for a vertically movable load supporting carriage.

It is still another object of our present invention to provide an attachment as aforesaid with a normally vertically extending telescopic mast construction which is adapted to be tilted either forwardly or rearwardly from its normally vertically extending position.

It is a further object of our present invention to provide an attachment, having a load elevating mechanism of the character noted, which may be readily incorporated with existing conventional self-propelled hand lift trucks.

In order to accomplish the aforementioned objects, we contemplate the provision of a carrier member having side frame members which are interconnected at their rear ends by a transverse vertical plate member and are adapted to be detachably secured to the main frame of a hand lift truck. The carrier member at its forward end has secured therein a transverse axle the ends of which are offset forwardly and carry ground engaging support wheels adjacent each side thereof. The carrier member is adapted to be detachably secured to the main frame in place of the load supporting platform means of a conventional hand lift truck. Pivotally mounted to the carrier, adjacent the forward end thereof, intermediate of the support wheels, is the lower end of a normally vertically extending telescopic mast construction which is adapted to be tilted either forwardly or rearwardly from its normally vertical position, by means of a hydraulic piston and cylinder assembly interconnected between the mast and the carrier member.

Now, in order to acquaint those skilled in the art with the manner of constructing and using the device of our present invention, we shall describe in connection with the accompanying drawings, a preferred embodiment of our invention.

In the drawings:

Figure 1 is a side elevational view of the self-propelled hand lift truck of our present invention; and Figure 2 is a partial plan view of the hand lift truck of Figure 1.

Referring now to the drawings, there is indicated generally by the reference numeral 10 a self-propelled hand lift truck. The truck 10 comprises a main frame 12 to which, at the forward end thereof, is secured a vertical transverse plate member 13. Pivotally mounted about a vertical axis to the underside of the main frame 12 is a wheel carrier 14. An electric motor-in-wheel assembly, indicated at 15, is rotatably mounted about a horizontal axis in the wheel carrier 14. For a further description of the mounting of the wheel carrier 14 to the main frame 12, reference may be made to the copending application of Wendell Boylan and George L. Turner, Serial No. 170,828, filed June 28, 1950. For a detail showing and description of the mounting of the motor-in-wheel assembly 15 in the carrier 14, reference may be made to the copending application of Fredrick E. Hawkins, Robert Lapsley, and George L. Turner, Serial No. 175,376, filed July 22, 1950 and now Patent No. 2,608,598. A steering handle 16 is pivotally mounted at its lower end to the wheel carrier 14, and the handle 16 at its upper end carries a control lever and switches for operating the various devices of the truck 10. A pair of housing members 17 and 18 are mounted on the main frame 12, and are, respectively, provided for enclosing the fluid pressure system which controls the load elevating mechanism, to be described hereinafter, and the batteries (not shown) which supply power to the electric motor-in-wheel assembly 15.

A carrier member 26 is provided, which is formed of generally converging vertical triangular side wall members 27. The side wall members 27 are interconnected at their rear ends by a vertical transverse plate member 28, which has secured to the vertical edges thereof flange members 29. The flange members 29 are disposed about, and are suitably secured to, the vertical edges of the vertical transverse plate member 13 carried by the main frame 12 of the truck 10. From the foregoing description, it will be realized that the carrier member 26 may be incorporated with the main frame of known hand lift trucks, such as, for example, of the character disclosed in the above referred to copending application of Wendell Boylan and George L. Turner. It should further be realized that by demounting the flange members 29 from the plate member 28, the carrier member 26 may be easily detached from the plate member 13, permitting other load engaging and supporting means to be substituted therefor, as, for example, that of the application last referred to.

A pair of spaced laterally inwardly extending rib members 30 are secured to the inner vertical surfaces of each of the side wall members 27. Journal blocks 31 are secured to the inner ends of each pair of rib members 30 for a purpose to be fully described hereinafter. A panel member 32 is secured along the upper edges of the side wall members 27 and the rib members 30, and an opening 33 is formed in the panel member 32, vertically above the bearing support members 31.

A transverse horizontal axle 34 is fixed to the carrier member 26, adjacent the forward end thereof. The ends of the axle 34 are offset forwardly at 35, providing spindle portions 35a on which wheels 36 are rotatably mounted.

A normally vertically extending mast construction, indicated generally by the reference numeral 37, is disposed at the forward end of the carrier member 26. The mast construction 37 comprises spaced apart C-shaped channel members 38 which are fixed at their lower ends to a brace member 39 having rearwardly extending spaced apart flange portions 40 journaled on the axle 34, intermediate of the sides of the carrier member 26 and the offset axle portions 35. The channel members 38 are interconnected adjacent their upper ends by a brace member 42.

Slidably mounted in the channel members 38 are channel members 43 in which the roller members 44 of a load supporting carriage 45 are mounted. Vertical movement of the load supporting carriage 45 within the channel members 43 and vertical movement of the channel members 43 within the channel members 38 is adapted to be effected by means of a hydraulic piston and cylinder assembly 46, mounted parallel to and between the channel members 38. The details of this type of mast construction are more or less conventional, and it is not believed necessary to describe the same in detail herein. This construction, for example, may be of the type which is disclosed in detail in the copending application of Alfred Wayne Gunning, Serial No. 752,593, filed June 5, 1947.

The load supporting carriage 45 carries a pair of horizontally spaced bracket members 47 to which are suitably secured a pair of vertically spaced transversely extending plate members 48 and 49. A pair of horizontally spaced L-shaped fork frames 50 have secured to their vertical legs, vertically spaced bracket members 51 and 52 which are adapted to be disposed, respectively, about the upper edges of the plate members 48 and 49.

A shaft 53 is journaled at its ends in the afore-described journal blocks 31 carried by the carrier member 26. Extending through the opening 33 in panel member 32 and journaled on the shaft 53 is the one end of a cylinder 54 of a hydraulic piston and cylinder assembly, indicated generally by the reference numeral 55. The hydraulic assembly 55 further comprises a piston 56 which is pivotally mounted at its outer end to the fixed channel members 38 of the mast construction 37. The cylinder 54 is connected in a conventional manner, through suitable fluid hose lines (not shown), to the fluid pressure system mounted on the main frame 12.

When a load is engaged by the fork frames 50, the latter, together with the load, may be elevated to any height, within the range of the mast construction, by selectively admitting fluid under pressure to the lower end of the hydraulic piston and cylinder assembly 46, which effects raising of the inner channel members 43, together with the load supporting carriage 45. A load may be lowered in the mast construction by selectively bleeding the fluid from the hydraulic assembly 46.

The mast construction 37 may be tilted forwardly by selectively admitting fluid under pressure to the rear end of cylinder 54 of the hydraulic piston and cylinder assembly 55 which extends the piston rod 56. When it is desired to tilt the mast assembly 37 rearwardly, as would be the case when a load is being transported from one location to another, fluid under pressure is admitted to the forward end of cylinder 54 of the hydraulic piston and cylinder assembly 55 which effects retraction of the piston rod 56.

Now, while we have shown and described what we believe to be a preferred embodiment of our present invention, it will be understood that various modifications and rearrangements may be made therein without departing from the spirit and scope of our invention.

We claim:

1. In a hand lift truck, the combination of a main frame including a transverse vertical plate member, a wheel unit for supporting said main frame, a forwardly extending carrier member detachably mounted on said transverse vertical plate member, a transverse axle fixed in said carrier member adjacent the forward end thereof, the ends of said axle being offset forwardly for providing spindle portions, wheels rotatably mounted on said spindle portions, a telescopic mast construction pivotally mounted at the lower end thereof on said axle intermediate said spindle portions, hydraulic piston and cylinder assembly means between said carrier member and said mast construction for effecting forward and rearward tilting of the latter, and a load supporting carriage movable in said mast construction.

2. An attachment for a hand lift truck comprising, a carrier member having a pair of side frame members, a transverse axle fixed in the one ends of said side frame members, the ends of said axle being offset forwardly for providing spindle portions, wheels rotatably mounted on said spindle portions, a vertical transverse plate member interconnecting the other ends of said side frame members, means for mounting the latter to the hand lift truck, a telescopic mast construction mounted at the lower end thereof on said axle intermediate said wheels, and a load supporting carriage movable in said mast construction.

3. An attachment for a hand lift truck comprising, a carrier member having a pair of side frame members, a transverse axle fixed in the one ends of said side frame members, wheels rotatably mounted on the ends of said axle, a vertical transverse plate member interconnecting the other ends of said side frame members, means for mounting the latter to the hand lift truck, a telescopic mast construction pivotally mounted at the lower end thereof on said axle intermediate said wheels, hydraulic piston and cylinder assembly means extending between and having connection with said carrier member and said mast construction for effecting forward and rearward tilting of the latter, and a load supporting carriage movable in said mast construction.

4. An attachment for a hand lift truck comprising, a carrier member having a pair of side frame members, a transverse axle fixed in the one ends of said side frame members, the ends of said axle being offset forwardly for providing spindle portions, wheels rotatably mounted on said spindle portions, a vertical transverse plate member interconnecting the other ends of said side frame members, means for mounting the latter to the hand lift truck, a telescopic mast construction pivotally mounted at the lower end thereof on said axle intermediate said spindle portions, hydraulic piston and cylinder assembly means extending between and having connection with said carrier member and said mast construction for effecting forward and rearward tilting of the latter, and a load supporting carriage movable in said mast construction.

5. An attachment for a hand lift truck comprising, a carrier member, a transverse axle fixed in said carrier member adjacent one end thereof, the ends of said axle being offset forwardly for providing spindle portions, wheels rotatably mounted on said spindle portions, means on the other end of said carrier member for mounting the latter to the hand lift truck, a telescopic mast construction pivotally mounted at the lower end thereof on said axle intermediate said spindle portions, hydraulic piston and cylinder assembly means extending between and having connection with said carrier member and said mast construction for effecting forward and rearward tilting of the latter, and a load supporting carriage movable in said mast construction.

6. An attachment for a hand lift truck comprising, a carrier member having forwardly extending converging side frame members, a transverse axle fixed in said carrier member adjacent the forward end thereof, offset spindle portions formed at the ends of said axle, wheels rotatably mounted on said spindle portions, means on the rear end of said carrier member for mounting the latter to the hand lift truck, a telescopic mast construction pivotally mounted at the lower end thereof on said axle intermediate said spindle portions, hydraulic piston and cylinder assembly means between said carrier member and said mast construction for effecting forward and rearward tilting of the latter, and a load supporting carriage movable in said mast construction.

References Cited in the file of this patent

UNITED STATES PATENTS

| Number | Name | Date |
|---|---|---|
| 1,952,730 | Remde | Mar. 27, 1934 |
| 2,059,150 | Schroeder | Oct. 27, 1936 |
| 2,104,323 | Hirschberg | Jan. 4, 1938 |
| 2,279,832 | Le Tourneau | Apr. 14, 1942 |
| 2,284,237 | Stevenson | May 26, 1942 |
| 2,384,059 | Wolf | Sept. 4, 1945 |
| 2,417,018 | Schroeder | Mar. 4, 1947 |
| 2,426,513 | Linn | Aug. 26, 1947 |
| 2,520,857 | Schreck | Aug. 29, 1950 |
| 2,527,928 | Heath | Oct. 31, 1950 |
| 2,598,865 | Turner | June 3, 1952 |
| 2,623,653 | Framhein | Dec. 30, 1952 |